US011368212B2

(12) United States Patent
Kalita et al.

(10) Patent No.: US 11,368,212 B2
(45) Date of Patent: Jun. 21, 2022

(54) LASER BEAM FOR EXTERNAL POSITION CONTROL AND TRAFFIC MANAGEMENT OF ON-ORBIT SATELLITES

(71) Applicant: Arizona Board of Regents on Behalf of the University of Arizona, Tucson, AZ (US)

(72) Inventors: Himangshu H. Kalita, Tucson, AZ (US); Leonard Dean Vance, Tucson, AZ (US); Vishnu Reddy, Tucson, AZ (US); Jekanthan Thangavelautham, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 138 days.

(21) Appl. No.: 16/571,721

(22) Filed: Sep. 16, 2019

(65) Prior Publication Data

US 2020/0091994 A1 Mar. 19, 2020

Related U.S. Application Data

(60) Provisional application No. 62/731,399, filed on Sep. 14, 2018.

(51) Int. Cl.
| | |
|---|---|
| *H04B 10/11* | (2013.01) |
| *H04B 7/185* | (2006.01) |
| *H04B 10/50* | (2013.01) |
| *B64G 1/10* | (2006.01) |
| *H04B 10/118* | (2013.01) |

(52) U.S. Cl.
CPC ......... *H04B 7/1851* (2013.01); *H04B 10/503* (2013.01); *B64G 1/10* (2013.01); *H04B 10/11* (2013.01); *H04B 10/118* (2013.01)

(58) Field of Classification Search
CPC .. H04B 7/1851; H04B 10/503; H04B 10/118; H04B 10/11; B64G 1/10; B64G 3/00; B64G 1/1085; B64G 1/44; B64G 1/40; B64G 1/66; B64G 1/24; B64G 1/244
USPC .................................................. 398/118–131
See application file for complete search history.

(56) References Cited

U.S. PATENT DOCUMENTS

| | | | | |
|---|---|---|---|---|
| 4,375,697 A | * | 3/1983 | Visher | ...................... H04B 7/19 244/158.4 |
| 6,097,373 A | * | 8/2000 | Jakobs | ................... G09B 21/02 345/158 |
| 6,346,933 B1 | * | 2/2002 | Lin | ........................ G06F 3/0386 345/157 |
| 6,396,523 B1 | * | 5/2002 | Segal | .................... H03J 1/0025 715/863 |

(Continued)

*Primary Examiner* — Dibson J Sanchez
(74) *Attorney, Agent, or Firm* — Stuart H. Mayer; Mayer & Williams PC

(57) ABSTRACT

A method for controlling a first device that includes a photovoltaic array such as a satellite in Earth orbit includes receiving a laser beam that is scanned over a plurality of photovoltaic cells in the photovoltaic array. A trajectory of the laser beam along the photovoltaic array is identified based on receipt of the laser beam by the plurality of photovoltaic cells. The trajectory is compared to a plurality of pre-defined gesture strokes to identify a first gesture stroke most closely matching the trajectory. A pre-defined action associated with the first gesture stroke is performed.

17 Claims, 15 Drawing Sheets

(56) References Cited

U.S. PATENT DOCUMENTS

| | | | |
|---|---|---|---|
| 2003/0117367 A1* | 6/2003 | Yan | G06F 3/0386 345/156 |
| 2010/0259486 A1* | 10/2010 | Anson | G06F 21/36 345/173 |
| 2010/0266290 A1* | 10/2010 | Altan | H04B 10/118 398/156 |
| 2011/0303826 A1* | 12/2011 | Liou | H05B 47/195 250/208.2 |
| 2013/0002539 A1* | 1/2013 | Dennard | G03B 21/26 345/156 |
| 2014/0101752 A1* | 4/2014 | Hrybyk | G06F 21/31 726/17 |
| 2016/0034038 A1* | 2/2016 | Duan | G06F 3/03547 345/156 |
| 2017/0141849 A1* | 5/2017 | Thangavelautham | H04B 7/195 |
| 2017/0346347 A1* | 11/2017 | Abiri | H02J 50/90 |
| 2018/0136364 A1* | 5/2018 | Kare | G01S 17/06 |
| 2019/0020304 A1* | 1/2019 | Bashford | G02B 19/0023 |
| 2019/0064353 A1* | 2/2019 | Nugent, Jr. | G01S 17/04 |
| 2019/0229558 A1* | 7/2019 | Pigeon | A61N 1/3787 |

* cited by examiner

LASER BEAM FOR EXTERNAL POSITION CONTROL AND TRAFFIC MANAGEMENT OF ON-ORBIT SATELLITES

BACKGROUND

The availability of high-performance Commercial Off-The-Shelf (COTS) electronics that can withstand Low Earth Orbit conditions has opened avenue for wide deployment of CubeSats and small-satellites. The rapid rise of small spacecraft and CubeSats in Low Earth Orbit (LEO) has increased accessibility, introducing new players to space exploration and enabling new commercial opportunities. At altitudes below 450 km, spacecraft face rapid decay in altitude due to aerodynamic drag and end up burning-up and disintegrating in the atmosphere within 1-2 years. With expected further advancement in electronics and increased congestion at lower altitudes, small spacecraft and CubeSats will begin to occupy higher altitudes in LEO. This is expected to include constellations of CubeSats to perform Earth observation, provide internet access, communications, Position, Navigation and Timing (PNT) and military services. Not all these satellites operate as intended in space and some may face premature failure and others may become immobile. Left unmanaged, these derelict satellites can become a space-debris problem. New approaches are needed to dispose of and perform traffic management of these small satellites and CubeSats to prevent congestion, formation of debris fields and rise of the "Kessler Effect."

One commonly suggested strategy to moving or collecting of space debris is the use of specialized servicing/disposer spacecraft to perform rendezvous, capture and manipulation. However, this presents operational complexity and risks when interacting and making physical contact with some of these derelict spacecraft that maybe damaged, spilling toxic propellants or containing spent radioactive waste.

SUMMARY

Described herein is an alternative approach to external servicing and space traffic management, where each spacecraft is plated with a "smart skin" containing solar panels, power and control circuitry together with an embedded secondary propulsion unit. A secondary propulsion unit may include electrospray propulsion, solar radiation pressure-based system, photonic laser thrusters and Lorentz force thrusters, all of which either require minimal fuel or are propellant-less.

In accordance with the subject matter described herein, a laser beam from another spacecraft or from the ground would interact with the solar panels of the derelict spacecraft. Solar panels typically occupy the largest surface area on an earth-orbiting satellite.

The "smart skin" can recognize gestural movements used to encode universal external positioning commands. The laser beam can simultaneously communicate a 'move' and thus trigger operation of the secondary propulsion unit. The solar-panels in turn can power the smart-skin to permit these communication and command procedures. The laser beam may be used to guide the movement of the spacecraft, trigger impulse maneuver commands, perform attitude control maneuvers and corrections. Ground and/or space surveillance can be used for verification, to start and stop movement, perform corrections and other such maneuvers.

The entire move maneuver can be implemented without operation of the Command and Data Handling Computer onboard the derelict satellite. Thus, the laser beam originating from ground effectively serves as a remote control for the spacecraft. Use of a laser beam to perform this external command and control has several important advantages. A laser beam enables secure point to point communication and cannot be eavesdropped, unless the eavesdropping unit is in the way or close to the derelict satellite. Both scenarios can be used to determine if an eavesdropping unit exists. However, if RF (Radio Frequency) were to be used, eavesdropping may be possible without detection. Moreover, RF signals require licensing and the RF spectrum is congested due to high demand. Use of a laser beam avoids these various logistical challenges.

The external servicing and space traffic management systems and techniques described herein may serve as a secure backup system that can be used to mitigate and take back control of a satellite from cybersecurity threats/hacking that can occur with the use of RF communication. A laser beam generated from the ground has the advantage of being extensible, with new and advanced optics, higher power transmission and high data frequency. Ground operation of the laser combined with ground surveillance offers a low-cost, secure approach to operate, keep track of and station-keep spacecraft and structures in space.

The systems and techniques described herein also facilitates staged intervention by a space traffic management organization to not only monitor, but also to provide commands to reposition satellites to thereby prevent unwanted collisions or, in extreme cases, external commandeering of the derelict or damaged satellites to eliminate risks of collisions. In addition to their application to individual satellites, these systems and techniques may also be applied to satellite swarms that need to be maintain close formation while avoiding collisions. The use of human gestures in the manner described herein enables intuitive interaction with spacecraft and should minimize fatigue and controller confusion after extended, strenuous intervention/commandeering.

DETAILED DESCRIPTION

Figure 1:
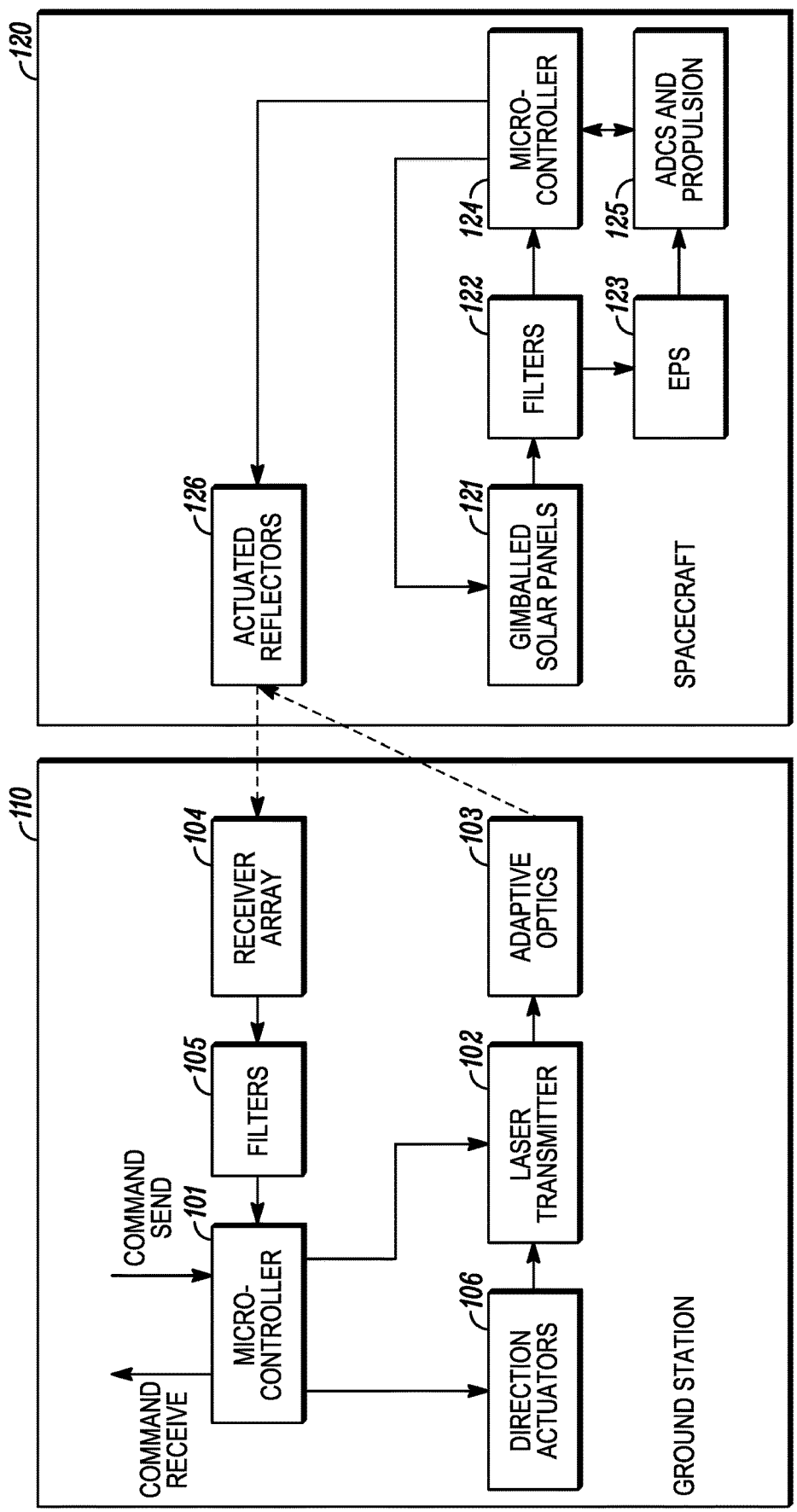
FIG. 1 shows a high-level block diagram of one example of a bidirectional communication architecture between a ground station and an orbiting spacecraft.

Compared with traditional radio frequency communication methods, laser communication provides much higher bandwidth with relatively small mass, volume and power requirements because lasers enable the beams of photons to be coherent over large distances. The Lunar Atmosphere and Dust Environment Explorer (LADEE) satellite has demonstrated the advantages of laser communication, providing high bandwidth for a relatively small sized spacecraft. However, LADEE utilized a laser system onboard the spacecraft to perform high-speed bidirectional communication and consumes between 50 and 120 Watts. This is too high for spacecraft that typically produce a total power of less than 20 Watts.

Previous work has demonstrated a bi-directional communication system on a spacecraft without the need for a laser on the spacecraft itself. Such work is described in U.S. Pat. No. 9,991,957 and X. Guo, J. Thangavelautham, "Novel Use of Photovoltaics for Backup Spacecraft Laser Communication System," IEEE Aerospace Conference, 2017, which are hereby incorporated by reference in their entirety.

It has also been shown that commercial space-grade solar panels can be used to detect and distinguish blue and violet laser beams even when exposed to sunlight. As described in more detail below, in some embodiments the subject matter described herein uses a laser beam to directly communicate and control derelict or inactive satellites and/or other structures floating in orbit. With a customized "smart skin" containing solar panels, power and control circuitry and an embedded secondary propulsion unit onboard a spacecraft a maneuver can be triggered by sending a laser signal in the form of a gesture command from a ground station or another orbiting spacecraft.

Sending stroke gesture commands using a simple pointing device is common in various computer applications like marking menus with a pointing device. Stroke gesture recognition is also used to send instructions to robots and to develop robotic interface by free hand stroke. Laser pointers has also been used extensively to send gesture commands to computers such as point-and-click or drag-and-drop. It has also been used to tell a robot which object to pick up, which button to push and to specify target objects and give commands to robots to execute accordingly.

Satellite formation flying using environmental forces has also been studied extensively. Use of differential aerodynamic drag for satellite formation flying using drag plates has been studied by many researchers. Similarly, satellite formation control using differential solar pressure with the help of solar flaps has also been studied. Moreover, the use of geomagnetic Lorentz force as a primary means of spacecraft propulsion for satellite formation flying is also a well-studied area. Techniques for detecting on-orbit satellites using laser ranging with centimeter accuracy has been shown. These techniques may be used to identify the on-orbit derelict satellites and send maneuver control commands. Moreover, solar panels have also been used as a simultaneous wake-up receiver and for power harvesting using visible light communication.

Illustrative System Architecture

The communication architecture described herein includes a customized "smart skin" containing solar panels, power and control circuitry and an embedded secondary propulsion system. A laser is beamed from a ground station or another spacecraft towards the satellite and the onboard photovoltaics acts as a wake-up laser receiver. This approach enables a laser ground station or a spacecraft to broadcast commands to the spacecraft in times of emergency that would trigger operation of the secondary propulsion system to perform impulse maneuvers, attitude control maneuvers and corrections. Moreover, adding an optional actuated reflector to the spacecraft will enable laser ranging and two-way communication between the ground station and the spacecraft, but without the laser diode being located on the spacecraft.

FIG. 1 shows a high-level block diagram of one example of a bidirectional communication architecture between a ground station 110 and an orbiting spacecraft 120. The ground station 110 is equipped with a microcontroller 101, a laser transmitter 102, an adaptive optics system 103, an array of laser receivers 104, a series of filters 105 and a series of direction actuators 106. To mitigate the effect of atmospheric turbulence, the adaptive optics system 103, together with a reference laser beam, is used to measure the beam's distortion when going through the atmosphere and compensate for the distortion by adjusting the deformable mirror of the adaptive optics system. The direction actuators 106 are used to point the laser transmitter 102 and the laser receiver array 104 towards the target spacecraft. The laser transmitter 102 can send a modulated laser beam to the target spacecraft 120. The laser receiver array 104 receives the reflected laser beam and then filters it to maximize the signal-to-noise (SNR) using the microcontroller 101.

On board the spacecraft 120, solar photovoltaic panels 121, which are generally gimballed, act as the laser beam receiver. The solar photovoltaic panels 121 each include a series of photovoltaic cells and are able to detect spatial information to determine where upon them the laser is incident. In one embodiment, the individual solar photovoltaic panels 121 are able to determine which particular photovoltaic cell the laser beam has hit. The received signal is then processed through filters 122 and the DC component and the communication signal is separated using a bias tree (not shown). The DC component is transmitted to the onboard electrical power system (EPS) 123 for power harvesting. The communication signal is processed through the microcontroller 124 to gain maximum SNR and the telemetry data is processed to trigger the onboard attitude determination and control system (ADCS) and propulsion system 125. An actuated reflector 126 is provided to enable bidirectional communication and optionally, laser ranging.

Figure 2:
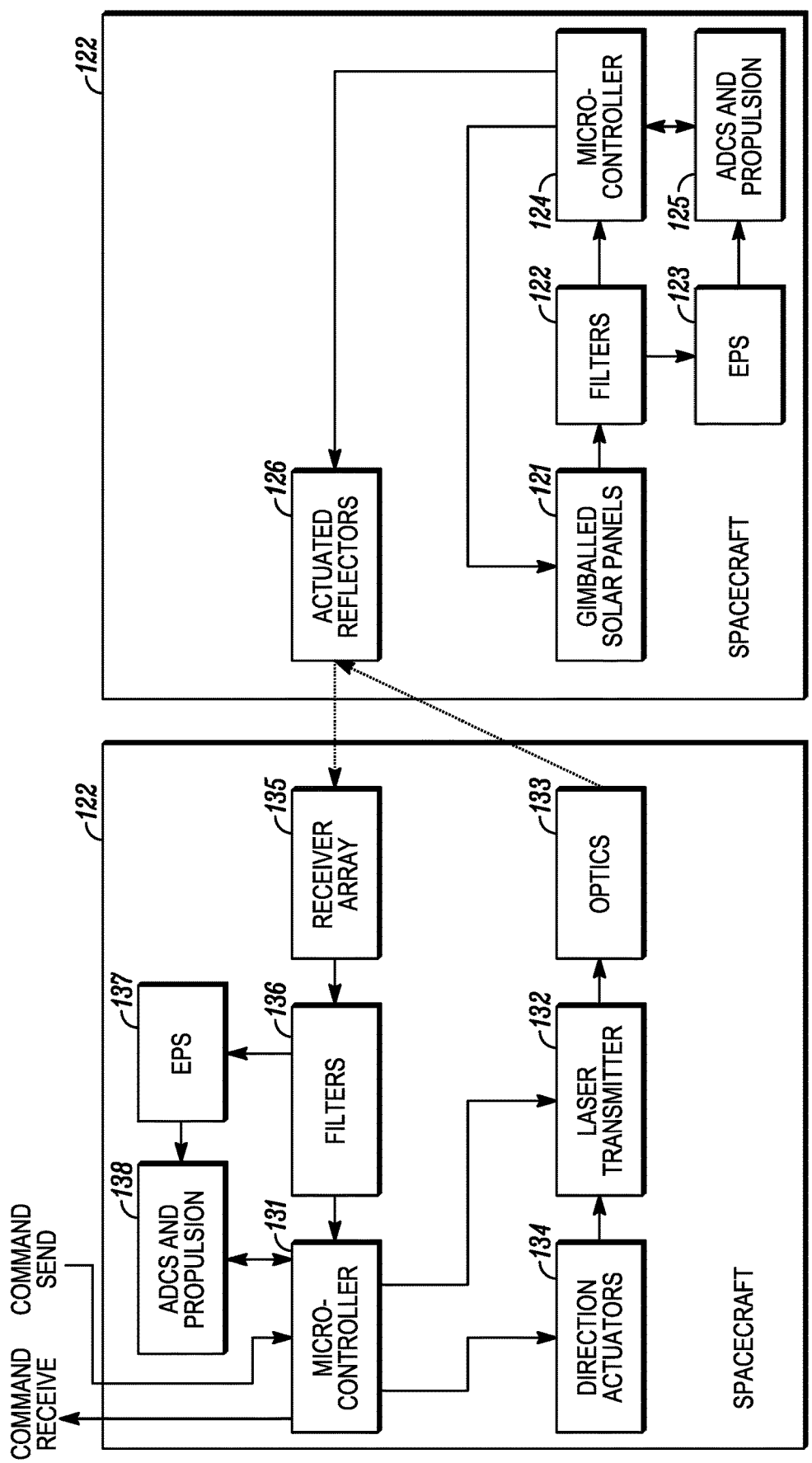
FIG. 2 shows a high-level block diagram of one example of a bidirectional communication architecture between two orbiting spacecrafts.

FIG. 2 shows a high-level block diagram of one example of a bidirectional communication architecture between two orbiting spacecrafts 130 and 120. In FIGS. 1 and 2, as well as the figures that follow, like elements are denoted by like reference numerals. The first spacecraft 130 is equipped with a receiver array 135, filters 136, microcontroller 131, a laser transmitter 132, an adaptive optics system 133 and a series of direction actuators 134 to send a gesture command through a laser signal. Also, like spacecraft 120, spacecraft 130 includes EPS 137 and ADCS and propulsion system 138. The second spacecraft 120 has been described above in connection with FIG. 1. In particular, the second spacecraft is equipped with a microcontroller 124 and gimballed solar panels 121 to identify the gesture command received from the first spacecraft 130 and trigger a maneuver.

Figure 3:
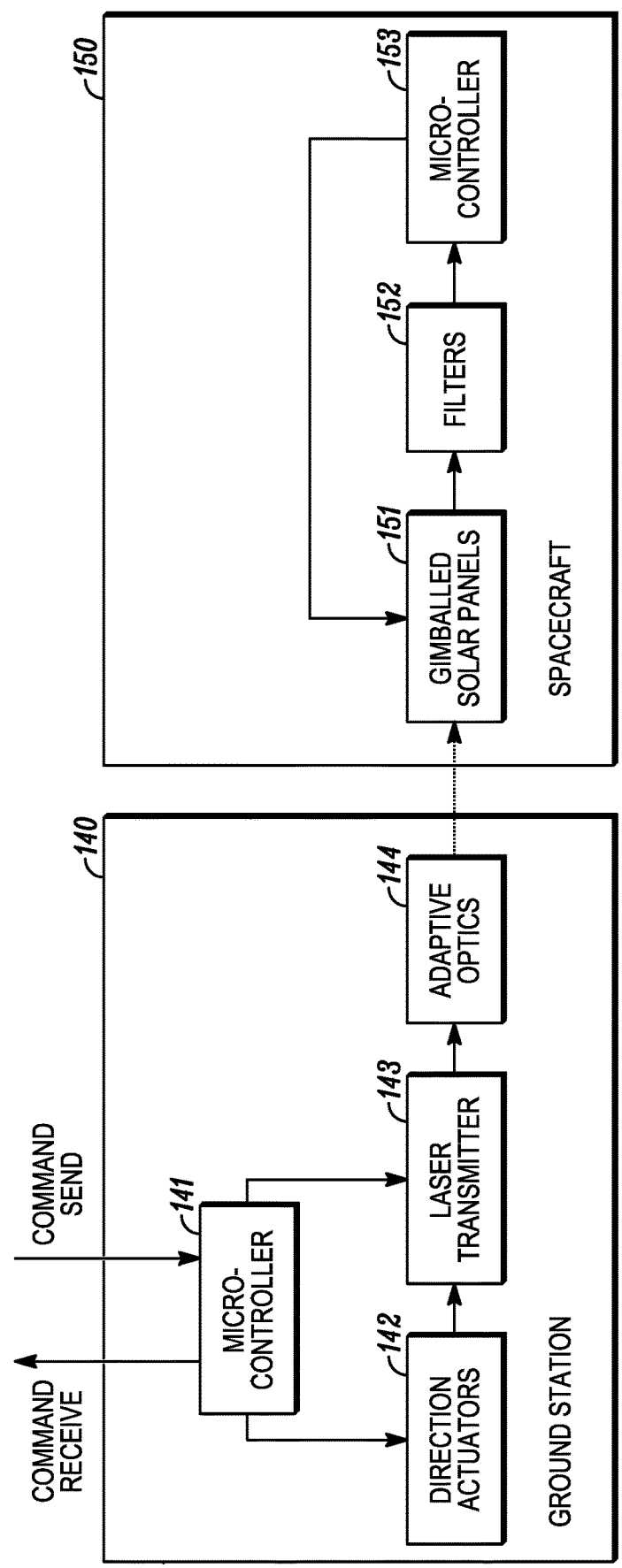
FIG. 3 shows a high-level block diagram of one example of a unidirectional communication architecture between a ground station and an orbiting spacecraft.

FIG. 3 shows a high-level block diagram of one example of a unidirectional communication architecture between a ground station 140 and an orbiting spacecraft 150. The ground station 140 includes microcontroller 141, direction actuators 142, laser transmitter 143, and adaptive optics 144, which operate in the manner described above. Likewise, spacecraft 150 includes solar photovoltaic panels 151, a series of filters 152 and a microcontroller 153, which operate in the manner described above.

Figure 4:
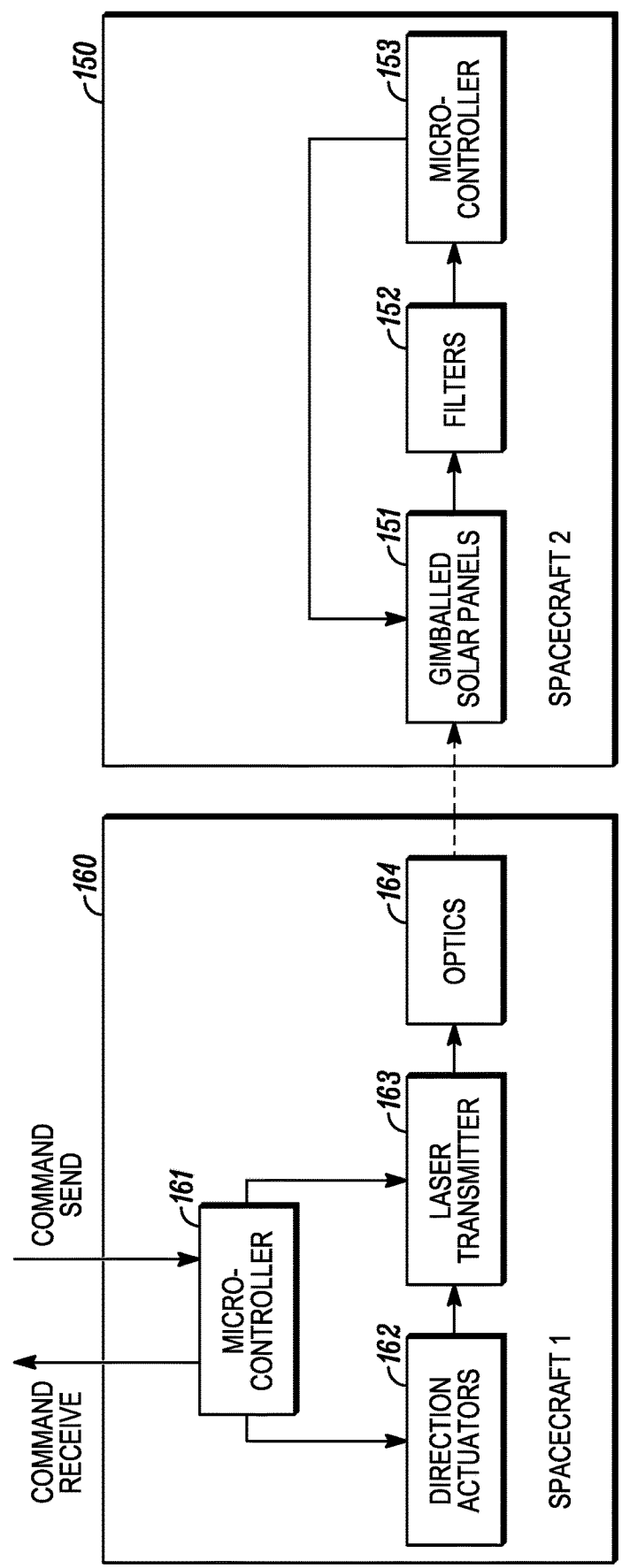
FIG. 4 shows a high-level block diagram of one example of a unidirectional communication architecture between two orbiting spacecrafts.

FIG. 4 shows a high-level block diagram of one example of a unidirectional communication architecture between two orbiting spacecrafts 160 and 150. The spacecraft 160 includes microcontroller 161, direction actuators 162, laser transmitter 163, and adaptive optics 164, which operate in the manner described above.

Gesture Control

Gestures are increasingly becoming a predominant mode of human-machine interaction. This is principally because they are intuitive, requiring minimal training. Stroke gestures, sometimes also called "pen gestures," represent the movement trajectory of one or more contact points on a sensitive surface. A significant advantage arising from the use of stroke gestures to input commands in that the user can specify several kinds of commands using just a simple pointing device. In the present case, a laser beam is used as a pointing device with the "smart-skin" acting as the sensitive sensing surface. In this way a laser beam from another spacecraft can interact with the solar panels of a derelict spacecraft.

For example, the laser beam can be used to communicate a 'move' gesture, which would then trigger one or more pre-defined operations on the derelict spacecraft. The laser beam may be used to guide the movement of the spacecraft, trigger impulse maneuver commands, perform attitude control maneuvers and corrections. This method of gesture control can be used to control a cluster of closely flying satellites and execute satellite formation flying. One important challenge of satellite formation flying involves controlling the relative positions of the satellites in the presence of external disturbances, i.e., gravitational perturbation, including the Earth's oblateness ($J_2$ effect), aerodynamic drag, and solar radiation pressure.

These issues can be addressed by the use of environmental forces including differential aerodynamic drag, differential solar radiation pressure, and Lorentz force. The satellite formation flying system comprises leader and follower satellites equipped with either drag plates, solar flaps or a Lorentz actuation system. The orbital equations of motion for the leader satellite and the relative equations of motion of the follower satellites are as follows:

$$\ddot{r}_c = r_c \dot{\theta}^2 - \frac{\mu}{r_c^2}, \ddot{\theta} = -\frac{2\dot{\theta}\dot{r}_c}{r_c} \tag{1}$$

$$m_f \ddot{x} - 2m_f \dot{\theta}\dot{y} - m_f(\dot{\theta}^2 x + \ddot{\theta}y) + m_f \mu \left\{ \frac{(r_c + x)}{r^3} - \frac{1}{r_c^2} \right\} = f_x + f_{dx} \tag{2}$$

$$m_f \ddot{y} + 2m_f \dot{\theta}\dot{x} + m_f(-\dot{\theta}^2 y + \ddot{\theta}x) + m_f \frac{\mu}{r^3} y = f_y + f_{dy} \tag{3}$$

$$\ddot{z} = -\frac{\mu z}{r^3} + f_z + f_{dz} \tag{4}$$

Figure 5A:
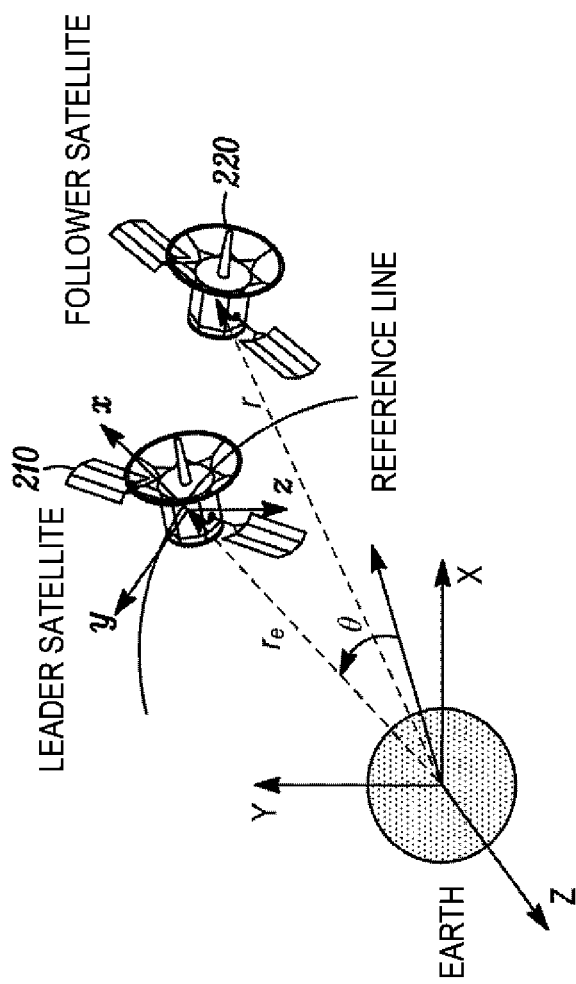
FIG. 5A shows leader and follower satellite reference frames and FIG. 5B shows a leader satellite sending a gesture command to a follower satellite using laser beams.

As shown in FIG. 5a, the leader satellite 210 is in a reference orbit that is assumed to be planar and defined by a radial distance $r_c$ from the center of the Earth and a true anomaly $\theta$. The follower satellite 220 moves in a relative trajectory about the leader satellite, in a relative frame xyz fixed at the leader satellite. In equations (2), (3) and (4) $m_f$ denotes the mass of the follower satellite, $f_{dx}$, $f_{dy}$, and $f_{dz}$ are the disturbance forces and $f_x$, $f_y$ and $f_z$ are the control forces. three different types of desired formation trajectories are considered herein: Along Track Formation Flying (AF); Projected Circular Formation Flying (PCF); and Circular Formation Flying (CF).

In AF, the follower shares the same ground track as the leader satellite. It has to keep a constant desired distance along a track separation of $r_d$ and the desired trajectory is defined as:

$$y_d = r_d \tag{5}$$

In PCF, the leader and the follower satellite maintain a fixed relative distance only on the yz plane and the formation is defined as $y^2 + z^2 = r_d^2$. The desired trajectory is defined as:

$$\begin{Bmatrix} x_d \\ y_d \\ z_d \end{Bmatrix} = \left(\frac{r_d}{2}\right) \begin{bmatrix} \sin(\dot{\theta}_m t + \varphi) \\ 2\cos(\dot{\theta}_m t + \varphi) \\ 2\sin(\dot{\theta}_m t + \varphi) \end{bmatrix} \tag{6}$$

In CF, the leader and the follower satellite maintain a constant separation from each other and the formation is defined as $x^2 + y^2 + z^2 = r_d^2$. The desired trajectory is defined as:

$$\begin{Bmatrix} x_d \\ y_d \\ z_d \end{Bmatrix} = \left(\frac{r_d}{2}\right) \begin{bmatrix} \sin(\dot{\theta}_m t + \varphi) \\ 2\cos(\dot{\theta}_m t + \varphi) \\ \sqrt{3}\sin(\dot{\theta}_m t + \varphi) \end{bmatrix} \tag{7}$$

Where $\varphi$ is the inplane phase angle between the leader and the follower satellites, and $\dot{\theta}_m = \sqrt{\mu/a_c^3}$ is the mean angular velocity.

Figure 5B:
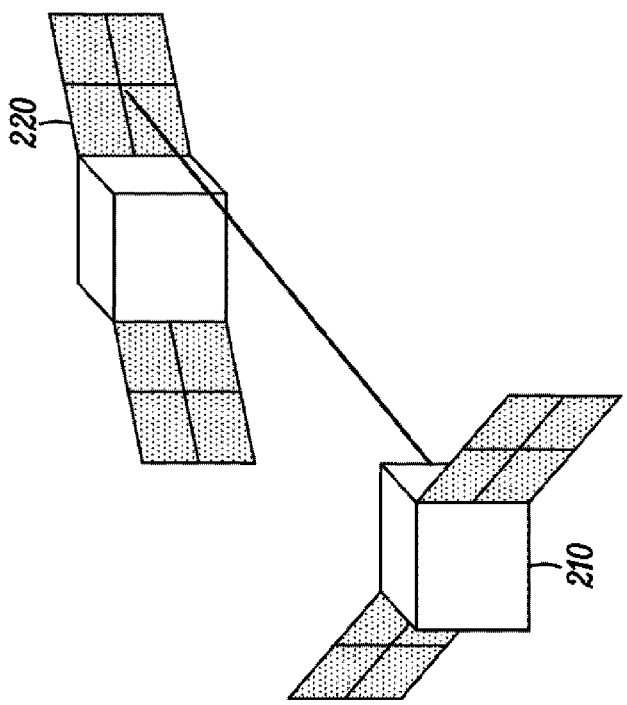
Figure 6A:
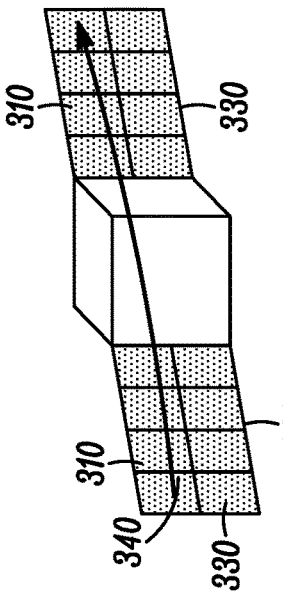
FIGS. 6a, 6b and 6c show illustrative gesture command strokes for Along track Formation flying (AF) (FIG. 6A), Projected Circular Formation Flying (PCF) (FIG. 6B) and Circular Formation Flying (CF).
Figure 6B:
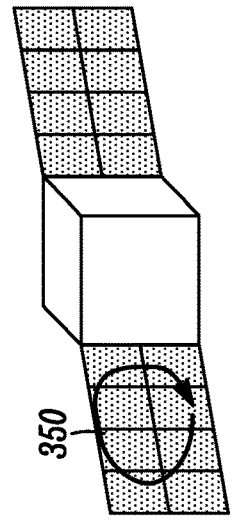
Figure 6C:
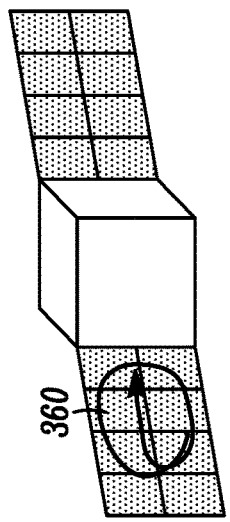

FIG. 5b shows het leader satellite 210 transmitting a laser beam 212 to the follow satellite 220. Single or multi-stroke gestures may be used for performing different satellite formation maneuvers. For instance, FIGS. 6a, 6b and 6c shows a satellite 300 having solar panels 310 each with a series of individual photovoltaic cells 330. FIG. 6a shows an illustrative single-stroke gesture 340 on the solar panels 310 representing along track formation flying (AF), FIG. 6b shows an illustrative single-stroke gesture 350 on the solar panels 310 representing projected circular formation flying (PCF), and FIG. 6c shows an illustrative single-stroke gesture 360 on the solar panels 310 representing circular formation flying (CF). The laser pointer on the leader satellite is mounted on a head that can move with fine precision using a SMA or piezoelectric actuation mechanism. The "smart-skin" can identify the laser hitting individual photovoltaic cells 330 and hence identify the gesture stroke.

In the example of FIG. 6a, when the leader satellite draws a straight line along the solar panels, the along track formation flying (AF) maneuver is triggered. Likewise, the drawing of a clockwise circle on the solar panels triggers the projected formation flying (PCF) maneuver while the drawing of a clockwise circle with a line along one of its diagonals triggers the circular formation flying (CF) maneuver.

Figure 7A:
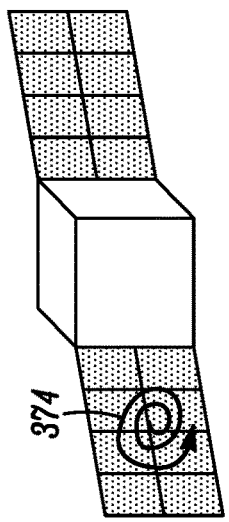
FIGS. 7A, 7B and 7C respectively show illustrative gesture strokes to cancel, undo and redo a maneuver.
Figure 7B:
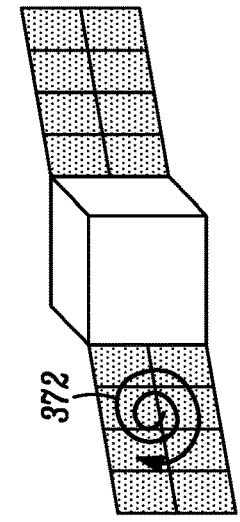
Figure 7C:
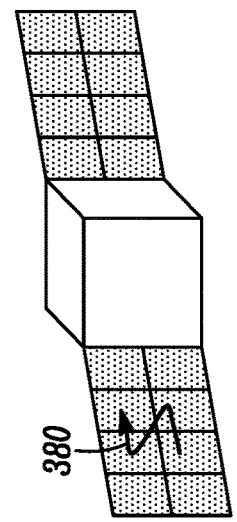
Figure 7D:
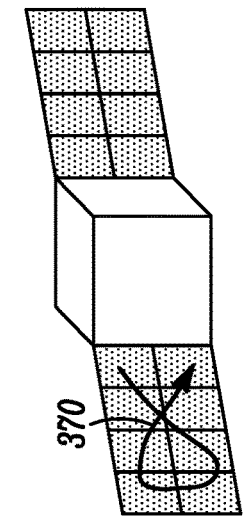
FIGS. 7D, 7E and 7F show gesture strokes on the solar panels that can be used to record a sequence of gestures strokes into a macro, including a record macro command (FIG. 7D), a play macro command (FIG. 7E) and a stop recording command (FIG. 7F).
Figure 7E:
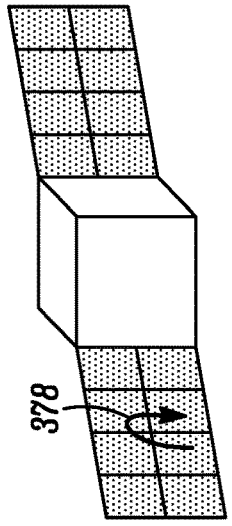
Figure 7F:
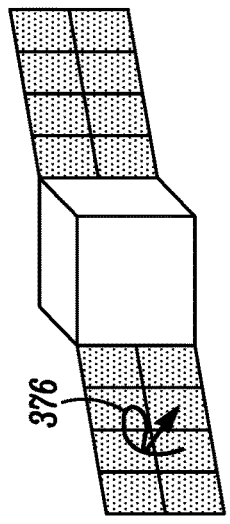

FIGS. 7a, 7b and 7c respectively show illustrative gesture strokes to cancel (gesture stroke 370), undo (gesture stroke 372) and redo (gesture stroke 374) a maneuver. FIGS. 7d, 7e and 7f show gesture strokes on the solar panels that can be used to record a sequence of gestures strokes into a macro. These macros include a record macro command (FIG. 7d), a play macro command (FIG. 7e) and a stop recording command (FIG. 7f) command, which are implemented using gesture strokes 376, 378 and 180, respectively.

Ground and/or space surveillance can be used for verification, to start and stop movement, perform corrections and other such maneuvers. The entire move maneuver would be made possible without operation of the Command and Data Handling Computer onboard the derelict satellite. Thus, the laser beam can act as a 'remote control' for the spacecraft.

Figure 8C:
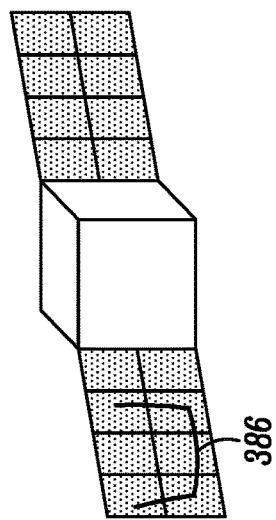
FIG. 8C shows an illustrative gesture command stroke to lock relative position and attitude of each current group member spacecraft to the leader.
Figure 8B:
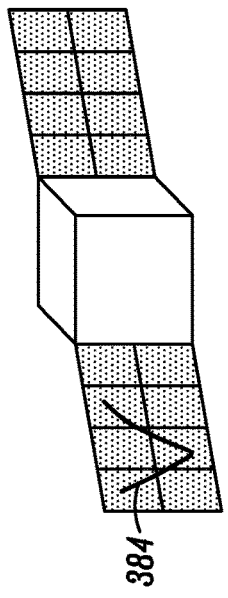
FIG. 8B shows an illustrative gesture command stroke to identify other spacecraft that are part of the current group.
Figure 8D:
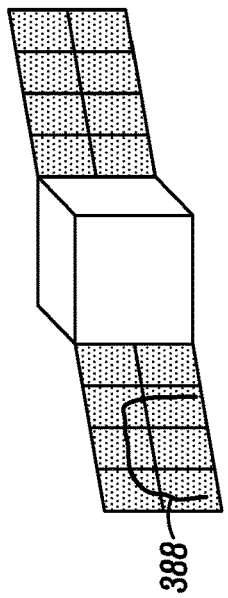
FIG. 8D shows an illustrative gesture command stroke to unlock relative position/attitude of a spacecraft from a group.
Figure 8A:
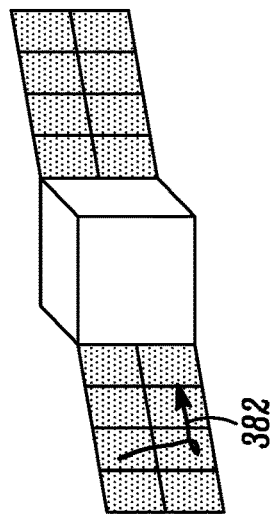
FIG. 8A shows an illustrative gesture command stroke to select a leader from amongst a flock of spacecraft.

For formation flight, a leader spacecraft is selected using a gesture command stroke 382 (FIG. 8a), followed by another gesture command stroke 384 to identify the remaining spacecraft in the group (FIG. 8b) and followed further by a gesture command stroke 386 locking the relative position of each spacecraft (FIG. 8c). After the group of spacecraft are locked in relative position and attitude, gestures movements may be applied to the leader spacecraft that result in the remainder of the spacecraft following the leader in tandem, maintaining fixed distance and attitude. Finally, FIG. 8d shows a gesture command stroke 388 for unlocking a spacecraft in terms of relative position and attitude from the group. Using the general approach described herein, an alphabet of gestures representing symbols and high-level commands can be represented. The limit on the number of gestures that may be employed is dependent on the solar-cell packing density (analogous to pixel density on a flat panel display) and the signal processing frequency (to recognize the speed of gesture movement). A third factor that may limit the number of gestures can be an optional modulation of the signal, described below.

In some embodiments the laser beam may be used to encode a signal through modulation. This modulation maybe used to encode for "intensity" without having to allocate a symbol in the alphabet of gestures. Applied with the gestures shown in FIG. 6, for example, the intensity may be proportional to the linear or angular velocity of the spacecraft. As another example, modulation may be applied with the play macro gesture to determine, for instance, the replay speed.

Laser Ranging

Identifying orbiting derelict satellites from ground is a key requirement to start or stop a movement, perform corrections and to perform verification. In some embodiments laser ranging from ground can be used to identify these satellites and perform maneuvers. The radar link equation for satellite laser ranging gives the number of photoelectrons expected to be received for a single laser pulse to be the following:

$$n_e = \eta_Q \left(E_T \frac{\lambda}{hc}\right) \eta_T G_T \sigma \left(\frac{1}{4\pi R^2}\right)^2 A_R \eta_R T_A^2 T_C^2 \quad (8)$$

Where, $E_T$ is the energy of the laser pulse, h is the Plank constant, c is the speed of light, $\sigma$ is the target's optical cross section, $A_R$ is the effective area of the telescope receive aperture, $T_A$ is the one-way atmospheric transmission, and $T_C$ is the one-way transmissivity of cirrus clouds. Assuming that the number of detected photoelectrons is Poisson distributed, the probability of detecting at least k electrons from a single pulse is:

$$p(k \mid n_e) = 1 - e^{-n_e} \sum_{m=0}^{k-1} \frac{n_e^m}{m!} \quad (9)$$

The number of detections per second d follows the binomial distribution with $p=p(k|n_e)$ as follows:

$$p(d \mid f) = \binom{f}{d} p^d (1-p)^{f-d} \quad (10)$$

Where f is the repetition rate in pulses per second. Thus, the probability of receiving at least n pulses per second is as follows:

$$p(n \mid f) = 1 - \sum_{d=0}^{n-1} p(d \mid f) \quad (11)$$

Figure 9:
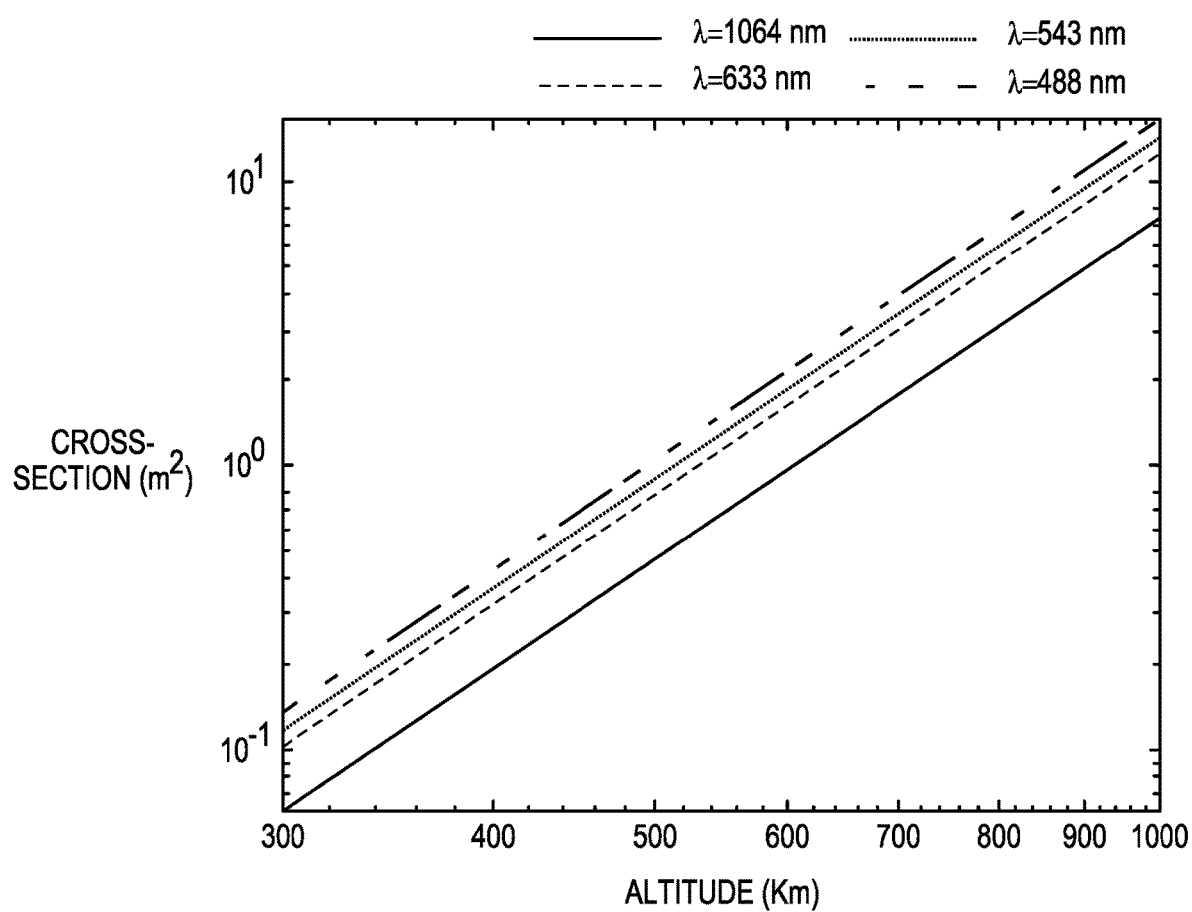
FIG. 9 is a graph showing the minimum target cross section required when using laser ranging for an 85% detection probability as a function of altitude.

For the target to be detectable from ground, we assumed a threshold value of 2 photoelectrons per pulse and set a minimum detection rate of 6 pulses per second. The zenith angle of the target is fixed at 30°, the repetition rate is f=2 kHz and the pulse energy is 5 mJ. The effective area of the receive telescope aperture $A_R=1$ m². FIG. 9 shows the minimum target cross section required for an 85% detection probability as a function of altitude.

Power Transmission

Figure 10:
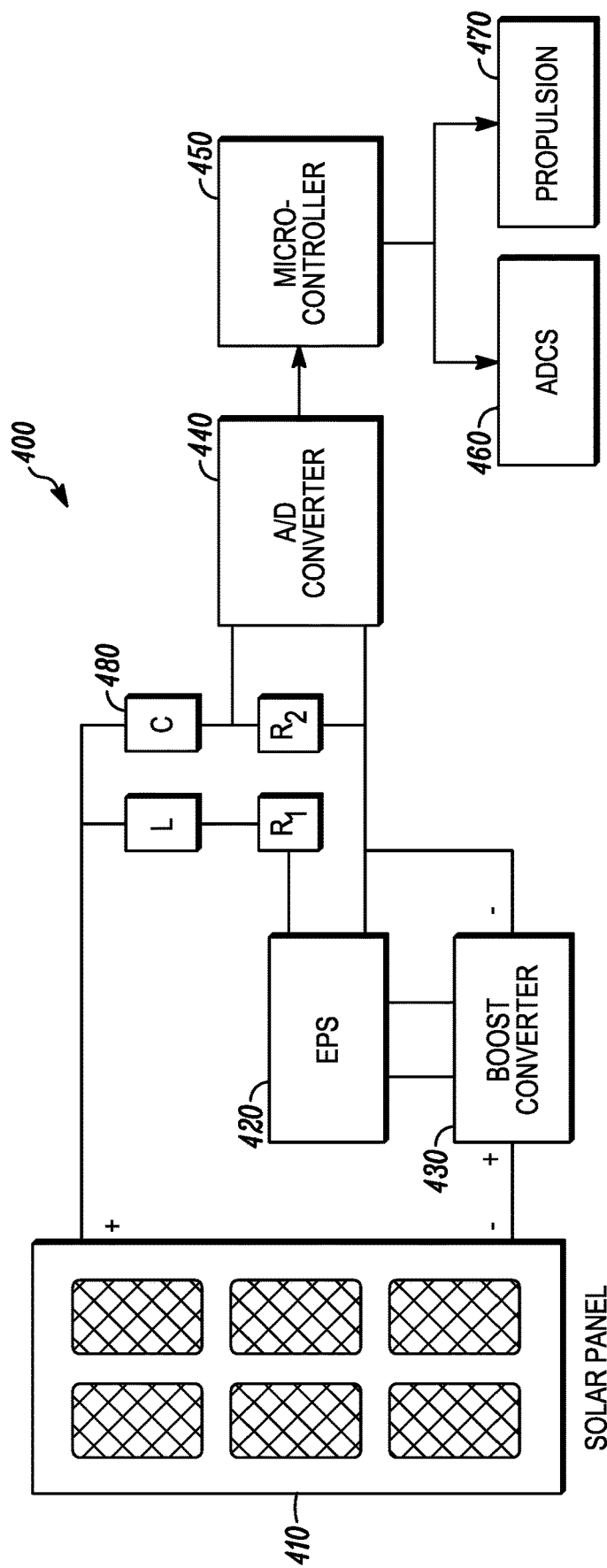
FIG. 10 shows one example of a smart skin system architecture in which solar panels are used to perform simultaneous communication and energy harvesting.

In addition to sending laser commands and performing gesture control maneuvers, the smart-skin can also be used to transmit power from ground while performing maneuvers in case of emergencies. FIG. 10 shows a block diagram of one example of a system architecture 400 of the onboard smart skin for simultaneous communication and energy harvesting. A self-reverse bias is applied to the solar panel 410 to improve its performance by increasing the number of photo-carriers and improving drift velocity. The energy harvesting branch is connected to the Electrical Power System (EPS) 420 that supplies the rated current and voltage to the battery for charging. A boost converter 430 is connected to the EPS 420 to supply a high reverse bias to the solar panel 410. The signal from the communication branch is provided to the analog to digital converter 440, which is subsequently processed by a microcontroller 450 for telemetry data. The telemetry data is then decoded to trigger the Attitude Determination and Control System (ADCS) 460 and propulsion system 470.

The frequency response of the receiver circuit (RC) 480 is given by:

$$|H(j\omega)|_{RC} = \sqrt{\frac{(R_1 R_2)^2 + (\omega R_1 L)^2}{(R_1 + R_2)^2 + \left(\omega L - \frac{1}{\omega C}\right)^2}} \quad (12)$$

The overall frequency response of the system is the product of the frequency response of the solar panel (SP) and the receiver circuit (RC):

$$|H(j\omega)|_{sys} = |H(j\omega)|_{SP} |(j\omega)|_{RC} \quad (13)$$

The optimal values of the parameters $R_1$, $R_2$, C and L is determined depending on the type of solar panel. The minimum spot diameter of a transmitted laser beam is set by its diffraction limit as follows:

$$D_{spot} = \frac{2.44 R \lambda}{D_T} \quad (14)$$

where R is the distance from the source to receiver, $\lambda$ is the wavelength of the laser beam and $D_T$ is the diameter of the lens. The spot diameter is defined as the first zero in the diffraction pattern which contains 84% of the beam energy. However, this limit can only be achieved if adaptive optics are used to eliminate atmospheric beam spread.

Figure 11A:
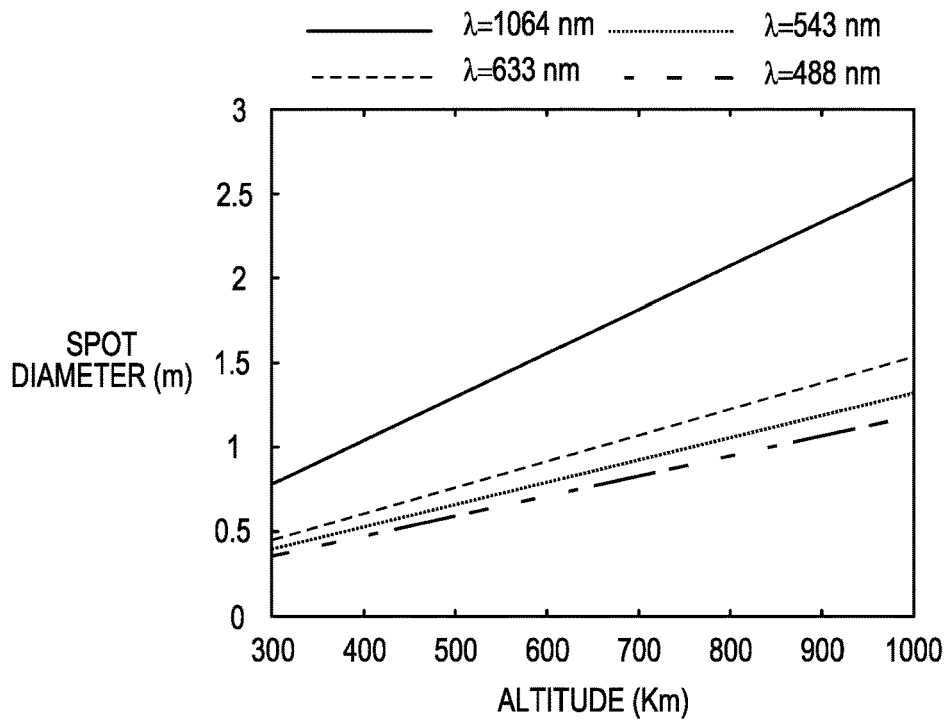
FIG. 11A is a graph showing the variation of spot diameter with altitude and FIG. 11B shows the variation of received power with altitude for different diameters of receiving antenna.

FIG. 11a shows the variation of spot diameter with altitude for lasers with different wavelength for $D_T$=1 m. It can be seen that the spot diameter is ~1 m for $\lambda$=1064 nm and ~0.48 m for $\lambda$=488 nm at an altitude of 410 km. If the spot size is larger than the receiving array, it may be desirable to decrease the wavelength to put more of the power on the array, even at the price of decreasing the efficiency, while if the spot size is smaller than the receiving array, the laser wavelength may be chosen for optimum solar cell performance.

For monochromatic illumination, existing solar cells have a peak response at about 850 nm (for GaAs cells) and about 950 nm (for Si cells). The efficiency decreases linearly with wavelength for wavelengths shorter than the peak. However, for longer wavelengths, the efficiency drops rapidly to zero. The efficiency is zero for photon energies lower than the bandgap $E_g$, or wavelengths longer than the cutoff wavelength, $\lambda_c$ as follows:

$$\lambda_c = \frac{1.24}{E_g} \quad (15)$$

Thus, it is important to select a wavelength near the optimum value. The efficiency of a solar cell to monochromatic illumination is much higher than the efficiency produced by the broad solar spectrum near the optimum wavelength. The received power $P_R$ is proportional to the transmitted power $P_T$, gain of the transmitting antenna $G_T$, gain of the receiving antenna $G_R$ and inversely proportional to the space loss $L_S$ as shown below:

$$P_R = P_T G_T \eta_T L_P L_A \eta_R G_R \eta_Q / L_S \quad (16)$$

Figure 11B:
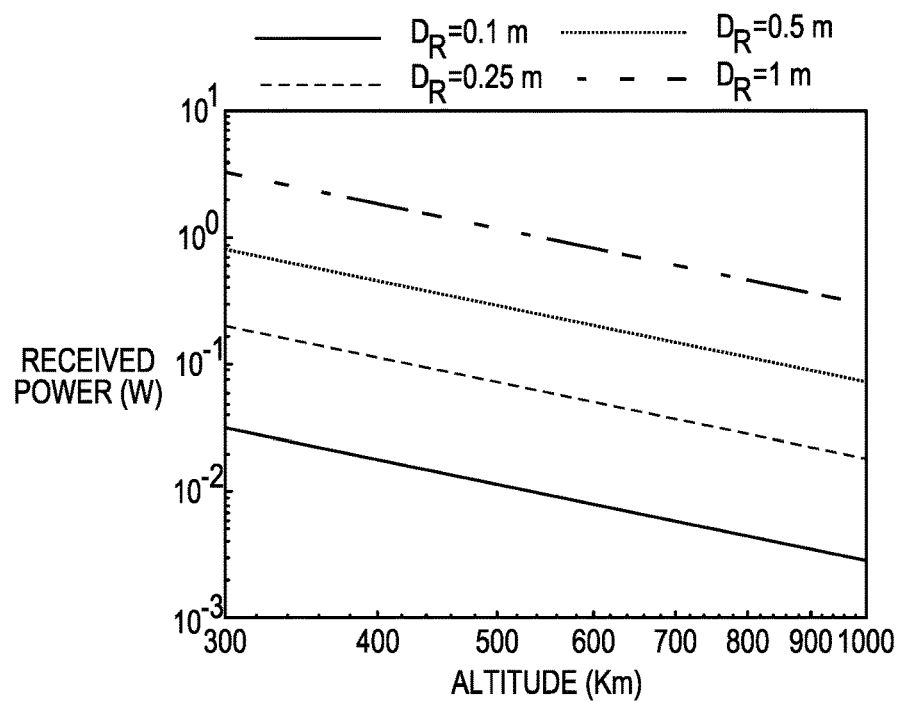
Figure 12:
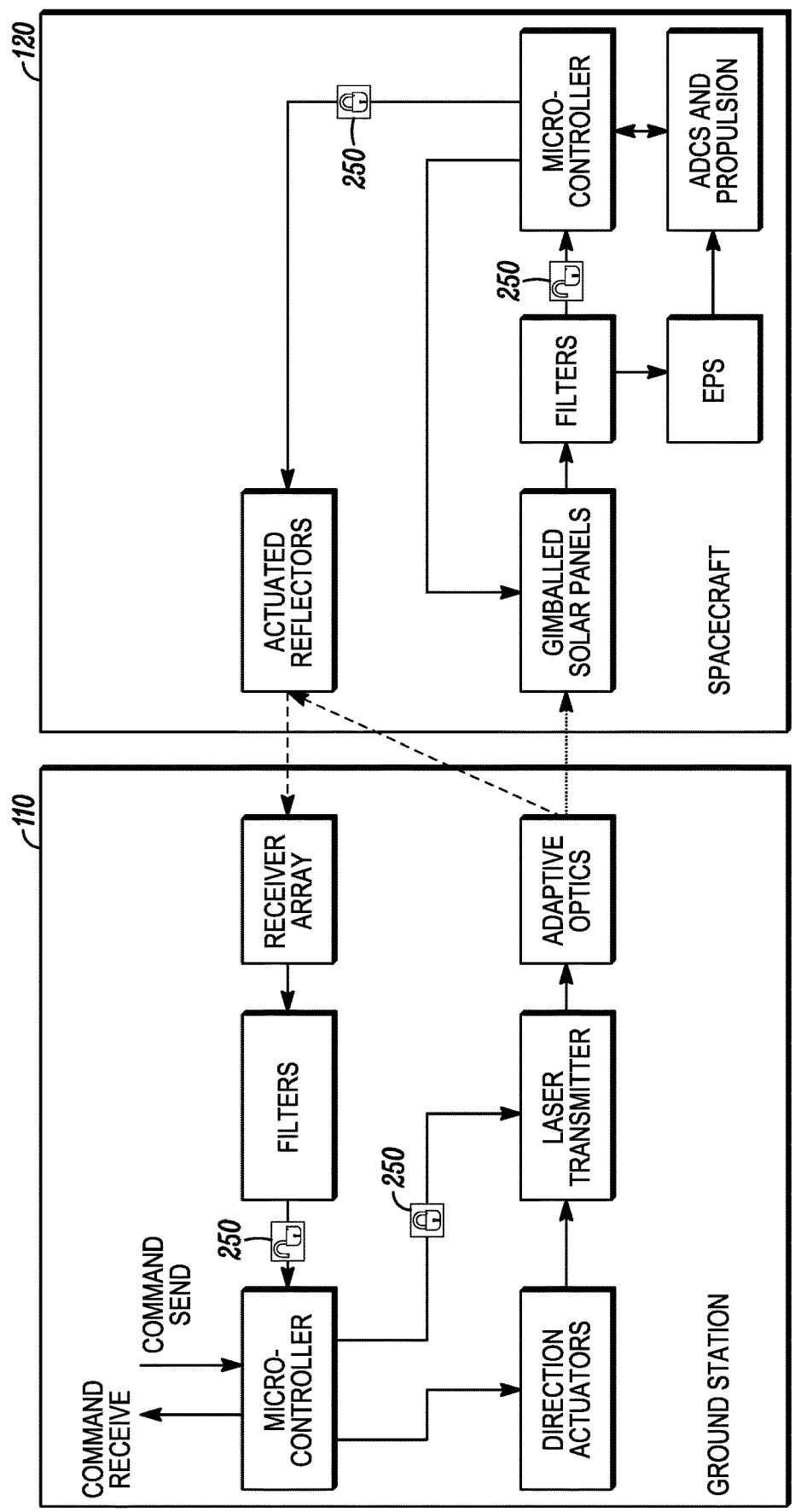
FIG. 12 shows a high-level block diagram of one example of an encrypted bidirectional communication architecture between a ground station and an orbiting spacecraft.
Figure 13:
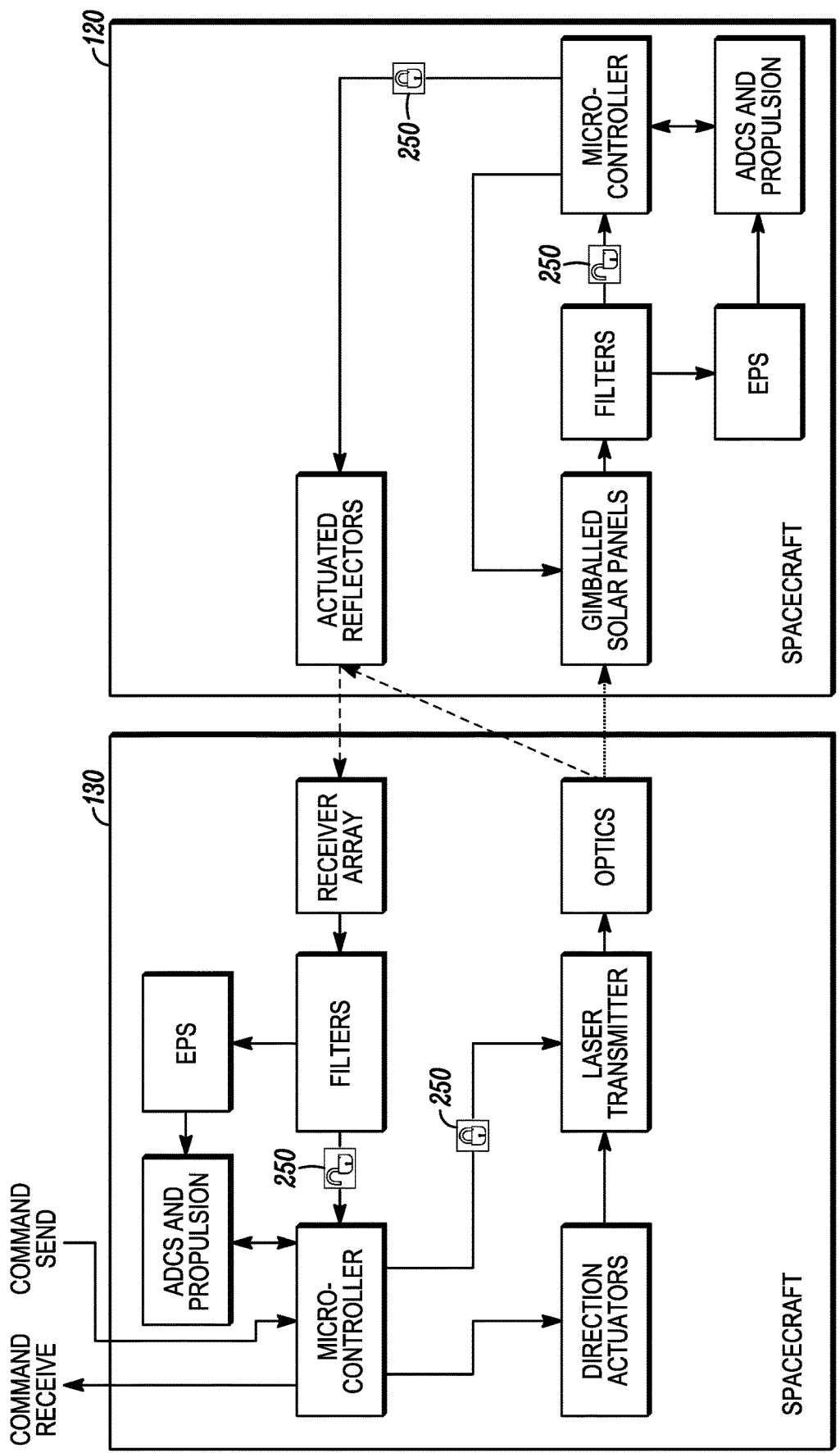
FIG. 13 shows a high-level block diagram of one example of an encrypted bidirectional communication architecture between two orbiting spacecrafts.
Figure 14:
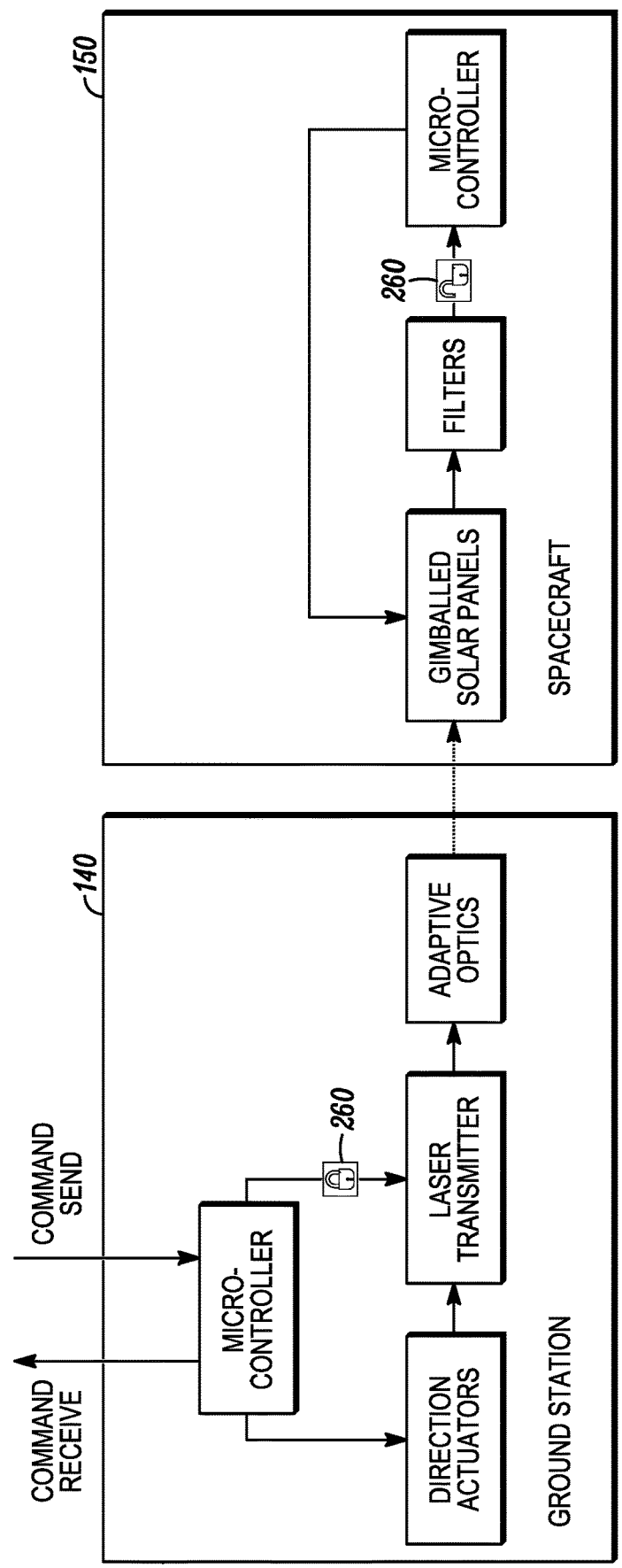
FIG. 14 shows a high-level block diagram of one example of an encrypted unidirectional communication architecture between a ground station and an orbiting spacecraft.
Figure 15:
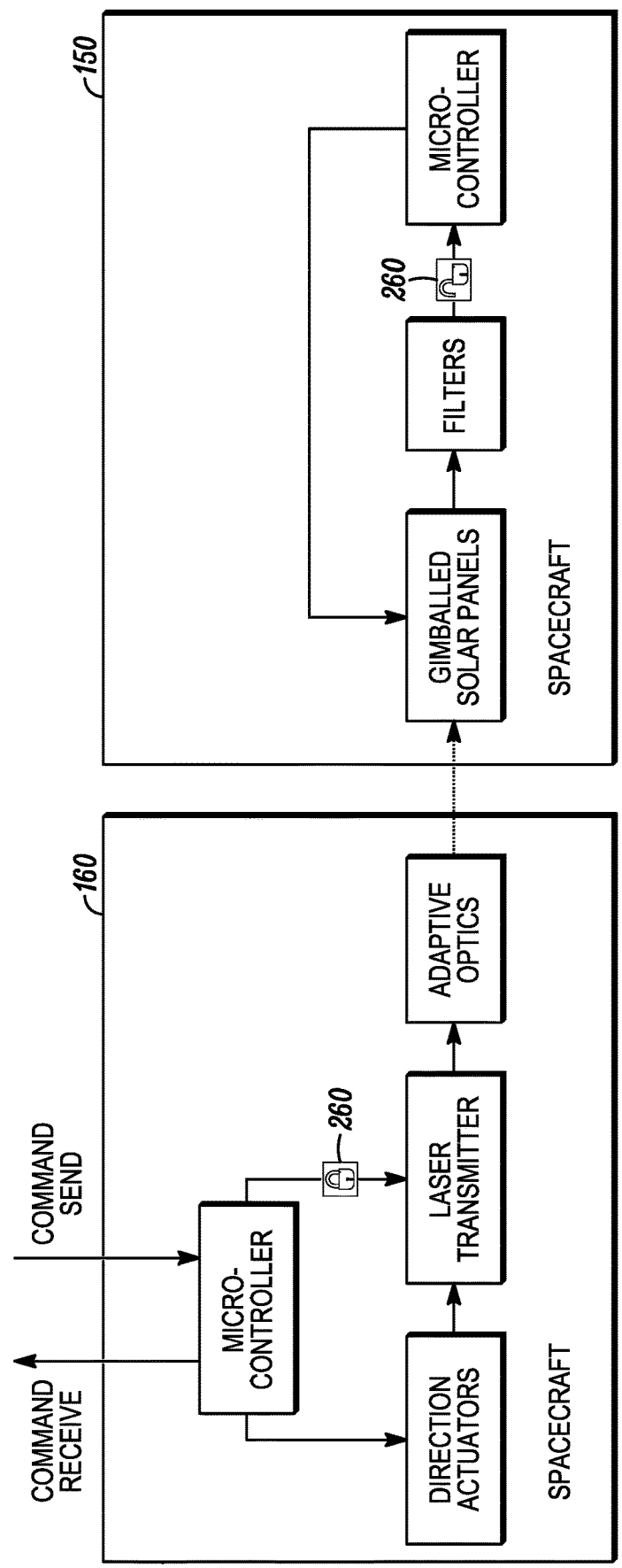
FIG. 15 shows a high-level block diagram of one example of an encrypted unidirectional communication architecture between two orbiting spacecrafts.

Where, $\eta_T$ is the efficiency of the transmitter optics, $\eta_R$ is the efficiency of the receiver optics, $L_P$ is the pointing loss, $L_A$ is the loss in atmosphere due to turbulence and weather, $\eta_Q$ is the quantum efficiency. Also, $G_T = (\pi D_T/\lambda)^2$, $G_R = (\pi D_R/\lambda)^2$ and $L_S = (4\pi R/\lambda)^2$. FIG. 11b shows the power received with altitude for lasers of different wavelength with $P_T$=10 W.

Encryption and Security

In some embodiments ground to spacecraft and spacecraft to spacecraft communication any be encrypted. Similar to FIGS. 1 and 2, FIGS. 12 and 13 show bidirectional communication, except FIGS. 12 and 13 further indicate points of encryption 250. Likewise, similar to FIGS. 3 and 4, FIGS. 14 and 15 show unidirectional communication except FIGS. 14 and 15 further indicate points of encryption 260. The encryption layer may be added for data and commands just before being sent to the laser transmitter. Decryption may be performed after the signal is filtered and ready to be interpreted by the microcontroller. Through this encryption/decryption process access to the spacecraft is only possible with the correct set of passcodes shared between ground control and spacecraft. In some cases the passcode for encryption and decryption may be provided as one or more gestures for which a prompt may be provided at the beginning of a message/command or passed through as a modulated signal. The passcode would then be used to decrypt the message and perform verification. If verification fails, the command message/communication may be ignored or the systems may enter a safe mode after too many wrong attempts.

Illustrative Methods

Figure 16:
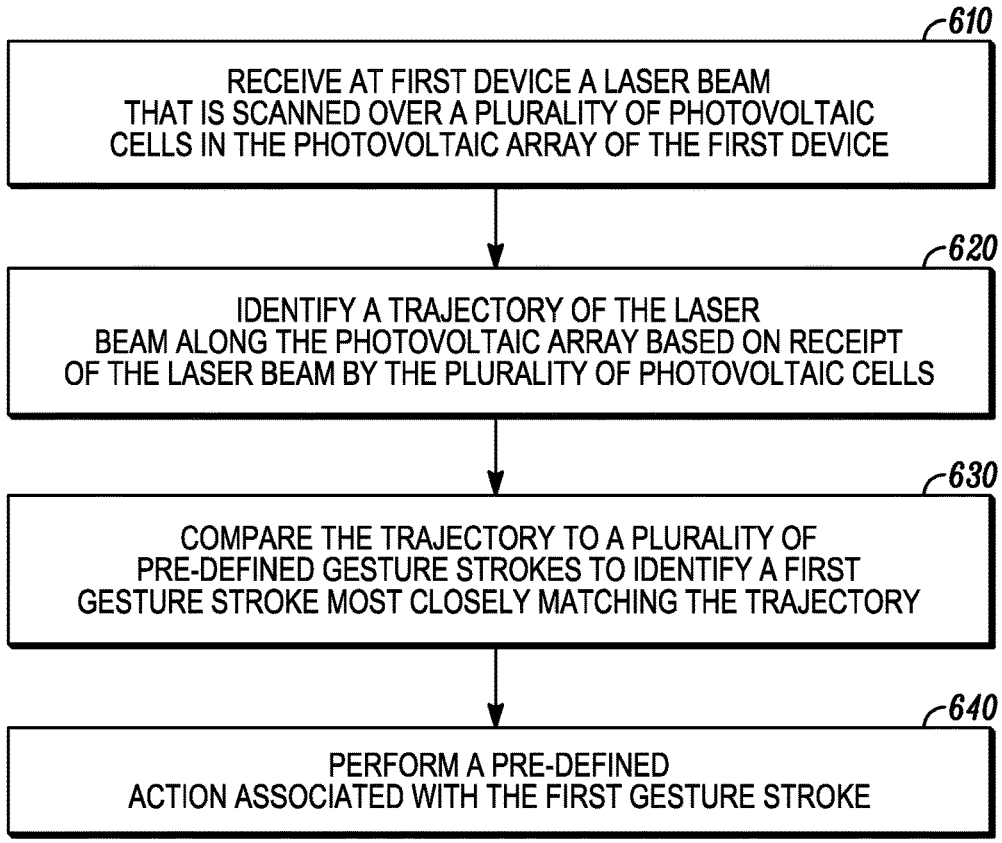
FIG. 16 and FIG. 17 depict flow diagrams of illustrative methods 600 and 700 for implementing and operating a device that includes a photovoltaic array.
Figure 17:
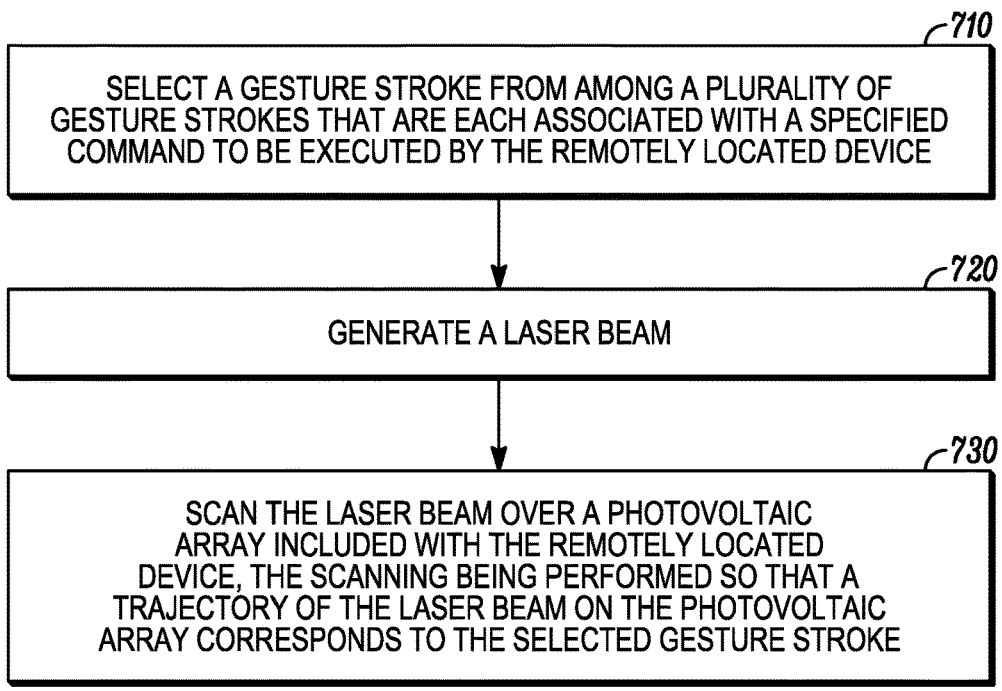

FIGS. 16 and 17 depict flow diagrams of illustrative methods 600 and 700 for implementing and operating a device that includes a photovoltaic array. In some embodiments the first device is a small mobile device such as a spacecraft in accordance with described embodiments. The methods 600 and 700 may be performed by processing logic that may include hardware (e.g., circuitry, dedicated logic, programmable logic, microcode, etc.), software (e.g., instructions run on a processing device to perform various operations such as generating, transmitting, receiving, modulating, actuating, reflecting, encoding, decoding, deciphering, interfacing, collecting, monitoring, diagnosing and reporting information, and executing/initiating instructions, or some combination thereof). In some embodiment, methods 600 and 700 are performed or coordinated via system architectures such as that depicted in the preceding figures. Some of the blocks and/or operations listed below are optional in accordance with certain embodiments. The numbering of the blocks presented is for the sake of clarity and is not intended to prescribe an order of operations in which the various blocks must occur. Additionally, operations from methods 600 and 700 may be utilized in a variety of combinations.

With reference to FIG. 16, the method 600 begins at block 610 with processing logic for receiving at a first device a laser beam that is scanned over a plurality of photovoltaic cells in the photovoltaic array of the first device. Next, at block 620 a trajectory of the laser beam along the photovoltaic array is identified based on receipt of the laser beam by the plurality of photovoltaic cells. The trajectory is compared to a plurality of pre-defined gesture strokes at block 630 to identify a first gesture stroke most closely matching the trajectory. A pre-defined action associated with the first gesture stroke is performed at block 640.

With reference to FIG. 17, the method 700 begins at block 710 by selecting a gesture stroke from among a plurality of gesture strokes that are each associated with a specified command to be executed by a remotely located device. A laser beam is generated at block 720. The laser beam is scanned over a photovoltaic array included with the remotely located device at block 730. The scanning is performed so that a trajectory of the laser beam on the photovoltaic array corresponds to the selected gesture stroke.

CONCLUSION

Described herein is a system architecture that may be used, for instance, for external position control and traffic management of on-orbit derelict satellites using a laser beam. The laser beam may be used to directly communicate and control derelict or inactive satellites and structures floating in orbit. The same approach maybe also used to actively command and control one or more satellites in a swarm. The satellite may have a customized "smart skin" containing solar panels, power and control circuitry and an embedded secondary propulsion unit. A laser beam from another spacecraft or from the ground can interact with the solar panels of the derelict spacecraft in the form of gesture commands. The on-orbit satellite will recognize the gesture commands and then trigger operation of the secondary propulsion unit. The laser beam also may be used to guide the movement of the spacecraft, trigger impulse maneuver commands, perform attitude control maneuvers and corrections.

For purposes of illustration simple gesture commands have been proposed to trigger along track formation flying, projected circular formation flying and circular formation flying maneuvers. Moreover, illustrative gesture commands to cancel, redo and undo a particular maneuver have also been proposed that would allow the laser beam to act as a remote control for the spacecraft. Laser ranging can be used for ground surveillance of the satellites, which can allow maneuvers to started, stopped or verified. In a need for emergency power arises, power can be transmitted from the ground or from space by launching a laser beam and allowing the "smart-skin" to operate as a power harvesting module.

In some embodiments the laser beam can enable a secure point to point communication and cannot be eavesdropped upon, unless the eavesdropping unit is in the way or close to the derelict satellite. However, if RF (Radio Frequency) were to be used instead of a laser beam, then eavesdropping may be possible without detection. RF signal requires licensing and is congested due to high demand. Use of a laser beam avoids these logistical challenges. The system architecture described herein may serve as a secure backup system that can be used to mitigate and regain control of a satellite from cybersecurity threats/hacking that could occur with the use of RF communication.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or functional block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

The invention claimed is:

1. A method for controlling a first device that includes a photovoltaic array, comprising:
receiving a laser beam that is scanned over a plurality of photovoltaic cells in the photovoltaic array of the first device, wherein the first device is a satellite in Earth orbit;
identifying a trajectory of the laser beam along the photovoltaic array based on receipt of the laser beam by the plurality of photovoltaic cells;
comparing the trajectory to a plurality of pre-defined gesture strokes to identify a first gesture stroke most closely matching the trajectory; and
performing a pre-defined action associated with the first gesture stroke, wherein the laser beam is a modulated laser beam that is modulated with data and further comprising extracting the data after receipt of the modulated laser beam by the photovoltaic array, and wherein the data is encrypted and a passcode for decryption is specified by one or more vesture strokes.

2. The method of claim 1, wherein the laser beam is received from a second satellite in Earth orbit.

3. The method of claim 1, wherein the laser beam is received from a ground station.

4. The method of claim 1, wherein the pre-defined action triggers operation of a secondary propulsion unit of the satellite.

5. The method of claim 1, wherein the pre-defined action includes an impulse maneuver.

6. The method of claim 1, wherein the pre-defined action includes an attitude control maneuver.

7. The method of claim 1, wherein the first device is a follower satellite and the laser beam is received from a second satellite that is a leader satellite and predefined actions respectively associated with the pre-defined gesture strokes specify a satellite formation flying mode.

8. The method of claim 7, wherein the satellite formation flying mode is selected from the group consisting of along track formation flying, projected circular formation flying and circular formation flying.

9. The method of claim 1, wherein the satellite is a CubeSat.

10. The method of claim 1, wherein each of the plurality of pre-defined gesture strokes specifies a different maneuver and additional pre-defined gesture strokes specify cancellation, redo and undo of the maneuvers.

11. The method of claim 1, wherein additional pre-defined gesture strokes specify a record macro command, a play macro command and a stop macro command.

12. The method of claim 1, wherein the pre-defined action causes the first device to move in predefined manner using a propulsion system in the first device.

13. The method of claim 1, wherein the laser beam is an unmodulated laser beam.

14. The method of claim 1, wherein the laser beam is a modulated laser beam, the modulation specifying at least one characteristic of the pre-defined action of the first gesture stroke.

15. The method of claim 1, further comprising extracting power from the laser beam that is received for powering the first device.

16. The method of claim 1, wherein a spatial resolution of the trajectory of the laser beam is equal to or less than an area encompassed by a single one of the photovoltaic cells.

17. The method of claim 1, wherein the first device is a robot.

* * * * *